(12) United States Patent
Fontana et al.

(10) Patent No.: US 12,353,880 B2
(45) Date of Patent: Jul. 8, 2025

(54) ONE-TIME PROGRAMMABLE (OTP) MEMORY CONTROLLER WITH A CONTROL CIRCUIT CONFIGURED TO ASSERT A PRE-LOAD START SIGNAL AND A PRE-LOAD END SIGNAL, RELATED PROCESSING SYSTEM, INTEGRATED CIRCUIT AND METHOD

(71) Applicant: STMicroelectronics S.r.l., Agrate Brianza (IT)

(72) Inventors: Antonino Giuseppe Fontana, Lentini (IT); Giuseppe Guarnaccia, San Gregorio di Catania (IT); Stefano Catalano, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/325,519

(22) Filed: May 30, 2023

(65) Prior Publication Data
US 2023/0409320 A1    Dec. 21, 2023

(30) Foreign Application Priority Data
Jun. 16, 2022   (IT) .................. 102022000012764

(51) Int. Cl.
*G06F 9/30*   (2018.01)
*G06F 3/06*   (2006.01)
*G06F 13/16*  (2006.01)

(52) U.S. Cl.
CPC .......... *G06F 9/3004* (2013.01); *G06F 3/0653* (2013.01); *G06F 9/30116* (2013.01); *G06F 9/30189* (2013.01)

(58) Field of Classification Search
CPC .. G06F 9/3004; G06F 3/0653; G06F 9/30116; G06F 9/30189; G06F 13/1673
See application file for complete search history.

(56) References Cited

U.S. PATENT DOCUMENTS

| | | | |
|---|---|---|---|
| 6,463,509 B1 | 10/2002 | Teoman et al. | |
| 2002/0069354 A1 | 6/2002 | Fallon et al. | |
| 2008/0232151 A1* | 9/2008 | Ahmed | G11C 17/18 365/96 |
| 2014/0129814 A1 | 5/2014 | Bi et al. | |
| 2014/0281703 A1* | 9/2014 | Tekumalla | G11C 29/4401 714/15 |
| 2023/0063588 A1* | 3/2023 | Werhane | G06F 13/4282 |
| 2023/0141786 A1* | 5/2023 | Son | G01R 31/318597 714/726 |

* cited by examiner

*Primary Examiner* — Shawn Doman
(74) *Attorney, Agent, or Firm* — Slater Matsil, LLP

(57) ABSTRACT

In an embodiment a One-Time Programmable (OTP) memory controller includes a data register, a given number K of shadow-registers, wherein the number K is smaller than a given number N of memory slots of an OTP memory area, a communication interface configured to receive a read request requesting the data of a given memory slot and a control circuit configured to receive a preload start signal and a shadow-register preload enable signal, wherein the control circuit is configured to manage a preload phase and a data-read phase.

20 Claims, 9 Drawing Sheets

ONE-TIME PROGRAMMABLE (OTP) MEMORY CONTROLLER WITH A CONTROL CIRCUIT CONFIGURED TO ASSERT A PRE-LOAD START SIGNAL AND A PRE-LOAD END SIGNAL, RELATED PROCESSING SYSTEM, INTEGRATED CIRCUIT AND METHOD

CROSS-REFERENCE TO RELATED APPLICATIONS

This application claims the benefit of Italian Application No. 102022000012764, filed on Jun. 16, 2022, which application is hereby incorporated herein by reference.

TECHNICAL FIELD

The present disclosure relate solutions for managing an OTP memory.

BACKGROUND

FIG. 1 shows a typical electronic system, such as the electronic system of a vehicle, comprising a plurality of processing systems 10, such as embedded systems or integrated circuits, e.g., a Field Programmable Gate Array (FPGA), a Digital Signal Processor (DSP) or a microcontroller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit, a Transmission Control Unit (TCU), an Anti-lock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units.

In this respect, future generations of such processing systems 10, e.g., micro-controllers adapted to be used in automotive applications, are expected to exhibit an increase in complexity, mainly due to the increasing number of requested functionalities (new protocols, new features, etc.) and to the tight constraints of execution conditions (e.g., lower power consumption, increased calculation power and speed, etc.). For example, recently more complex multi-core processing systems 10 have been proposed. For example, such multi-core processing systems may be used to execute (in parallel) several of the processing systems 10 shown in FIG. 1, such as several ECUs of a vehicle.

FIG. 2 shows an example of a processing system 10, such as a multi-core processing system. Specifically, in the example considered, the processing system 10 comprises one or more processing cores 102, such as a plurality of n processing cores $102_1 \ldots 102_n$, connected to a (on-chip) communication system 114. For example, in the context of real-time control systems, the processing cores $102_1 \ldots 102_n$ may be ARM Cortex®-R52 cores. Generally, the communication system 114 may comprise one or more bus systems, e.g., based on the Advanced eXtensible Interface (AXI) bus architecture, and/or a Network-on-Chip (NoC).

For example, as shown at the example of the processing core $102_1$, each processing core 102 may comprise a microprocessor 1020 and a communication interface 1022 configured to manage the communication between the microprocessor 1020 and the communication system 114. Typically, the interface 1022 is a master interface configured to forward a given (read or write) request from the microprocessor 1020 to the communication system 114, and forward an optional response from the communication system 114 to the microprocessor 1020. However, the communication interface 1022 may also comprise a slave interface. For example, in this way, a first microprocessor 1020 may send a request to a second microprocessor 1020 (via the communication interface 1022 of the first microprocessor, the communication system 114 and the communication interface 1022 of the second microprocessor). Generally, each processing core $102_1 \ldots 102_n$ may also comprise further local resources, such as one or more local memories 1026, usually identified as Tightly Coupled Memory (TCM).

Typically, the processing cores 102 are arranged to exchange data with one or more non-volatile memories 104 and/or one or more volatile memories 104b. Generally, the memories 104 and/or 104b may be integrated with the processing cores 102 in a single integrated circuit, or the memories 104 and/or 104b may be in the form of a separate integrated circuit and connected to the processing cores 102, e.g., via the traces of a printed circuit board.

Specifically, in a multi-core processing system 10 these memories are often system memories, i.e., shared for the processing cores $102_1 \ldots 102_n$. For example, for this purpose, the communication with the memories 104 and/or 104b may be performed via one or more memory controllers 100 connected to the communication system 114. As mentioned before, each processing cores 102 may, however, comprise one or more additional local memories 1026.

For example, the software executed by the microprocessor(s) 1020 is usually stored in a non-volatile program memory 104, such as a Flash memory or EEPROM, i.e., the memory 104 is configured to store the firmware of the processing unit 102, wherein the firmware includes the software instructions to be executed by the microprocessor 102. Conversely, a volatile memory 104b, such as a Random-Access-Memory (RAM), may be used to store temporary data.

Often, the processing system 10 comprises also one or more (hardware) resources/peripherals 106, e.g., selected from the group of:
- one or more communication interfaces, e.g., for exchanging data via the communication system 20, such as a Universal asynchronous receiver/transmitter (UART), Serial Peripheral Interface Bus (SPI), Inter-Integrated Circuit (I2C), Controller Area Network (CAN) bus, and/or Ethernet interface, and/or a debug interface; and/or
- one or more analog-to-digital converters and/or digital-to-analog converters; and/or
- one or more dedicated digital components, such as hardware timers and/or counters, or a cryptographic co-processor; and/or
- one or more analog components, such as comparators, sensors, such as a temperature sensor, etc.; and/or
- one or more mixed signal components, such as a PWM (Pulse-Width Modulation) driver.

The resources 106 are usually connected to the communication system 114 via a respective communication interface 1062. For example, one or more of the interfaces 1062 may be connected to the communication system 114 via a peripheral bridge 107. For example, for this purpose, the communication system may indeed comprise an Advanced Microcontroller Bus Architecture (AMBA) High-performance Bus (AHB) 114, and an Advanced Peripheral Bus (APB) 114*b* used to connect the resources/peripherals 106 via the peripheral bridge 107 to the AMBA AHB bus 114. In general, the communication interface 1062 comprises at least a slave interface. For example, in this way, a processing core 102 may send a request to a resource 106 and the resource returns given data. Generally, one or more of the communication interfaces 1062 may also comprise a respective master interface. For example, such a master interface, often identified as integrated Direct Memory Access (DMA) controller, may be useful in case the resource has to start a communication in order to exchange data via (read and/or write) request with another circuit connected to the communication system 114, such as a resource 106 or a processing core 102.

As shown in FIG. 2, often such processing systems 10 comprise also an one-time programmable (OTP) memory 120, e.g., implemented with fuses. For example, such an OTP memory 120 may be used to store configuration data of the processing system. Typically, the configuration data stored to the OTP memory 120 are read via:

software instructions executed by a microprocessor 1020; and/or a hardware configuration circuit 108 configured to read at least in part the content of the OTP memory 120.

For example, the configuration data stored to the OTP memory 120 may comprise a first set of configuration data comprising one or more of:

calibration data, boot information;

configuration data for one or more resources 106, such as a media access control (MAC) address of an Ethernet communication interface 106;

life-cycle data of the processing system 10;

security configuration data, e.g., used to enable or disable memory locations in the memory 104, 104*b* and/or 120, and/or a debug interface of the processing system; and/or cryptographic data, such as one or more cryptographic keys, and/or public and private certificates, used by a cryptographic co-processor.

Such configuration data of the first set of configuration data are usually stored to dedicated memory locations within the OTP memory 120 and are read via a hardware configuration circuit 108 when the processing system 10 is switched on. However, often the OTP memory 120 may also be used to store a second set of configuration data, which may be used to store user and/or product specific data. Usually, the second set of configuration data is not read via the hardware configuration circuit 108, but may be read via a software instruction executed by a microprocessor 1020.

Accordingly, typically the OTP memory 120 is connected in some way to the communication system 114, for example via a memory controller 100 and/or the peripheral bridge 107 and/or directly. Accordingly, in this way, a microprocessor 1020 may read data from the OTP memory 120 by sending a read request to the communication system 114, wherein the read request comprises, respectively:

an address managed by the memory controller 100;

an address managed by the peripheral bridge 107;

directly an address associated with the interface of the OTP memory 120.

Similarly, the hardware configuration circuit 108 may communicate with the OTP memory 120 via the communication system 114, or directly via the memory controller 100, the peripheral bridge 107 or the OTP memory 120.

Accordingly, as shown in FIG. 3, the OTP memory 120 comprises an OTP memory area 1200 comprising a plurality of memory slots OTP1, OTP2, . . . , OTPN, wherein each memory slot has a given word size of a given number of bits, such as 8, 16, 32 or 64 bits. Moreover, the OTP memory 120 comprises a communication interface 1202, e.g., for connecting the OTP memory 120 to the communication system 114, such as a peripheral bus interface 1202 for connecting the OTP memory 120 to the peripheral bus 114*b*.

Accordingly, in the example considered, the OTP memory 120 may receive a read request via the interface 1202, wherein the read request comprises data, such as an address, indicating a given memory slot of the memory slots OTP1, OTP2, . . . , OTPN. Accordingly, a control circuit 1204 may read the respective data from the memory area 1200, store the data read to a register 1206 and the communication interface 1202 may return the data stored to the register 1206.

As shown in FIG. 3, often such OTP memories 120 comprise one or more shadow-registers 1208. In this case, the OTP memory 120 receives usually a signal POK indicating that the processing system 10 has been switched on. In response to this signal POK, the control circuit 1204 reads then the data from the OTP memory area 1200 and stores the data read to the shadow-registers 1206. Typically, once having completed the read operation, the control circuit 1204 asserts a signal OTP_DONE, which, e.g., may be used to start the hardware configuration circuit 108. Accordingly, in this case, when receiving a read request, the communication interface 1202 may read the data from the shadow-registers 1208, thereby accelerating the access to the data stored to the OTP memory 120. Generally, as schematically shown in FIG. 3, such shadow-registers 1208 may also be used, when the data stored to one or more of the shadow-registers 1208 are directly provided to one or more other circuits of the processing system 10, i.e., without passing through the communication systems 114 and/or 114*b*. For example, this may apply to security and/or cryptographic configuration data, which are preferably not transmitted via the communication channels 114 and/or 114*b*.

Generally, in some OTP memories 120, not all memory locations have indeed associated respective shadow-registers 1208, but only a part/sub-set of the memory locations OTP1, OTP2, . . . , OTPN is transferred to respective shadow-registers 1208, such as the memory locations configured to be read by the hardware configuration circuit 108, while other memory locations OTP1, OTP2, . . . , OTPN may require that the control circuit 1204 first reads the data from the respective memory location 1200 and stores the data to the (shared) register 1206.

As shown in FIG. 3, often such OTP memories 120 comprise also one or more further communication interfaces, such as:

a communication interface 1210 for authentication with another circuit, such as a Coresight authentication interface; and/or a communication interface 1212 for a debug interface of the processing system 10, such as a JTAG interface, which, e.g., may be used to program data to the memory area 1200.

For example, such an OTP memory 120 is known in the context of the STM32MP1 Boot and Security Controller (BSEC).

The inventors have observed that such a preload mechanism via shadow-registers 1208 may be rather inefficient, especially in case the processing system 10 uses a low power mode, wherein the processing system 10 is switched off once having executed given tasks and is switched on again in response to given events. In fact, in this case, the processing system 10, in particular the hardware configuration circuit 108 and/or other circuits expected to receive data from the OTP memory 120, cannot be started until the signal OTP_DONE is asserted. In this respect, a typical OTP memory 120 may require a read time of, e.g., 10 microsecond per word. Thus, when using larger OTP memories, such as OTP memories having more than 1000 bits, the boot time of the processing system 10 is significantly increased. Moreover, loading the cryptographic data at each boot may also expose the processing system 10 to security risks.

SUMMARY

Embodiments provide solutions for managing an OTP memory more efficiently.

As mentioned before, various embodiments of the present disclosure relate to an OTP memory controller, e.g., in the form of an integrated circuit, configured to manage an OTP memory area. Specifically, in various embodiments, the OTP memory area comprises a given number N of memory slots. In various embodiments, the OTP memory controller comprises a data register and a given number K of shadow-registers, wherein the number K is smaller than the number N. A communication interface is configured to receive at least a read request requesting the data of a given memory slot.

Specifically, in various embodiments, the OTP memory controller comprises a control circuit configured to receive a preload start signal and a shadow-register preload enable signal. For example, the shadow-register preload enable signal may have the given number N of bits, wherein each bit indicates whether a respective memory slot should be pre-loaded. Alternatively, the shadow-register preload enable signal may have the given number K of bits, wherein each bit indicates whether a respective shadow-registers should be pre-loaded. However, also other encoding schemes may be used for the shadow-register preload enable signal.

In various embodiments, the control circuit is configured to manage a preload phase and a data-read phase. Specifically, in response to the preload start signal, the control circuit is configured to start the preload phase. In various embodiments, during the preload phase, the control circuit determines the mapping between the shadow-registers and the memory slots. For example, for this purpose, the control circuit may receive a shadow-register mapping signal and determine the mapping between the given number K of shadow-registers and the given number N of memory slots as a function of the shadow-register mapping signal. A similar shadow-register mapping signal may also be used just in the synthesis process of the control circuit, whereby the respective mapping is implemented, e.g., via a combinational logic circuit.

Next, the control circuit determines for each of the shadow-registers whether the respective shadow-register should be preloaded as a function of the shadow-register preload enable signal. For example, in response to determining that a shadow-register should be preloaded, the control circuit may transfer data from the memory slot mapped to the shadow-register to the respective shadow-register. Finally, once having preloaded the shadow-registers based on the shadow-register preload enable signal, the control circuit asserts a preload end signal and starts the data-read phase.

In various embodiments, during the data-read phase, the control circuit is configured to receive a read request via the communication interface and select the respective memory location indicated in the read request. Next the control circuit determines whether the selected memory location is mapped to a shadow register. Specifically, in response to determining that the selected memory location is mapped to a shadow register, the control circuit selects the shadow-register mapped to the selected memory location and determines whether the selected shadow-register has been pre-loaded. In various embodiments, in response to determining that the selected shadow-register has been pre-loaded, the control circuit directly transmits the data stored to the selected shadow register via the communication interface, i.e., without accessing the OTP memory area. Conversely, in response to determining that the selected shadow-register has not been pre-loaded, the control circuit transfers data from the selected memory slot to the selected shadow-register and then transmits the data stored to the selected shadow register via the communication interface. Conversely, in response to determining that the selected memory location is not mapped to a shadow register, the control circuit may transfer data from the selected memory slot to the data register and then transmit the data stored to the data register via the communication interface.

In various embodiments, the control circuit may also manage a data-write/programming phase. In this case, the control circuit may be configured to receive a write request via the communication interface and select the respective memory location indicated in the write request, wherein the write request comprises respective data to be stored to the selected memory location. For example, in various embodiments, the control circuit may determine whether the selected memory location is mapped to a shadow register. In response to determining that the selected memory location is mapped to a shadow register, the control circuit may select the shadow-register mapped to the selected memory location, store the data to the selected shadow-register and program the data stored to the selected shadow-register to the selected memory location. Conversely, in response to determining that the selected memory location is not mapped to a shadow register, the control circuit may store the data to the data register and program the data stored to the data register to the selected memory location.

For example, such an OTP memory controller may be used in a processing system having plural power domains. For example, in various embodiments, such a processing system comprises a power supply circuit configured to receive an input voltage and provide a first supply voltage and a second supply voltage, wherein the power supply circuit is configured to selectively enable the first supply voltage when a low-power control signal is de-asserted and disable the first supply voltage when the low-power control signal is asserted.

In various embodiments, a first sub-circuit of the processing system is configured to be supplied by the first supply voltage. Specifically, the first sub-circuit comprises the OTP memory area and the OTP memory controller. In various embodiments, the first sub-circuit comprises also a power supply monitoring circuit configured to assert the preload start signal when the first supply voltage exceeds a given threshold voltage, a digital processing circuit, and at least a first resource connected to the digital processing circuit and arranged to receive first configuration data from the OTP memory. For example, for this purpose, the processing system may comprise a hardware configuration circuit and/or the configuration data may be read via the digital processing circuit. In various embodiments, the first sub-circuit comprises also a reset management circuit configured to, in response to the preload end signal, start the digital processing circuit.

In various embodiments, the processing system comprises also a second sub-circuit configured to be supplied by the second supply voltage. In various embodiments the second sub-circuit comprises a power management circuit configured to generate the low-power control signal, wherein the power management circuit is configured to, in response to a request received from the digital processing circuit, assert the low-power control signal and, in response to an event signal, de-assert the low-power control signal. In various embodiments, the second sub-circuit comprises also at least one second resource connected to the digital processing circuit and arranged to receive second configuration data.

Specifically, in various embodiments, the OTP memory controller is configured to map a first memory slot of the OTP memory configured to store the first configuration data to a first shadow-register and a second memory slot of the OTP memory configured to store the second configuration data to a second shadow-register. Specifically, in this case, in response to switching on the processing system, the processing system asserts the preload start signal via the power supply monitoring circuit and sets the preload enable signal in order to preload the first configuration data from the first memory slot to the first shadow-register and the second configuration data from the second memory slot to the second shadow-register. Next, in response to the preload end signal, the processing system transfers the first configuration data from the first shadow-register to the first resource and the second configuration data from the second shadow-register to the second resource.

In various embodiments, the digital processing circuit sends then a request to the power management circuit in order to assert the low-power control signal, thereby disabling the first supply voltage and switching off the first sub-circuit. In response to the event signal, the power management circuit de-asserts again the low-power control signal, thereby enabling the first supply voltage and switching on the first sub-circuit.

In various embodiments, in response to switching on the first sub-circuit, the processing system asserts again the preload start signal via the power supply monitoring circuit. However, this time, the processing system sets the preload enable signal in order to preload the first configuration data from the first memory slot to the first shadow-register and disable the preloading of the second configuration data from the second memory slot to the second shadow-register. Next, in response to the preload end signal, the processing system transfers the first configuration data from the first shadow-register to the first resource and inhibits the transmission of the second configuration data from the second shadow-register to the second resource.

Accordingly, when returning from the low power mode, only the configuration data used by the first sub-circuit may be pre-loaded by the OTP memory controller and the processing system may only transfer the configuration data for the first sub-circuit.

For example, in various embodiments, the processing system, e.g., the second sub-circuit, comprises for this purpose a circuit configured to generate the preload enable signal. For example, this circuit may generate the preload enable signal as a function of a first signal received from the first resource and/or a second signal received from the second resource. For example, the first signal may indicate whether the first resource has stored the first configuration data and the second signal may indicate whether the second resource has stored the second configuration data.

Additionally or alternatively, the circuit may receive a third signal from the optional configuration circuit configured to transfer the first configuration data from the first shadow-register to the first resource and the second configuration data from the second shadow-register to the second resource. For example, the third signal may indicate whether the first configuration data have been transferred from the first shadow-register to the first resource and/or whether the second configuration data have been transferred from the second shadow-register to the second resource.

Additionally or alternatively, the circuit may receive a fourth signal from the digital processing circuit, wherein the fourth signal indicates whether to pre-load the first configuration data and/or whether to pre-load the second configuration data.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
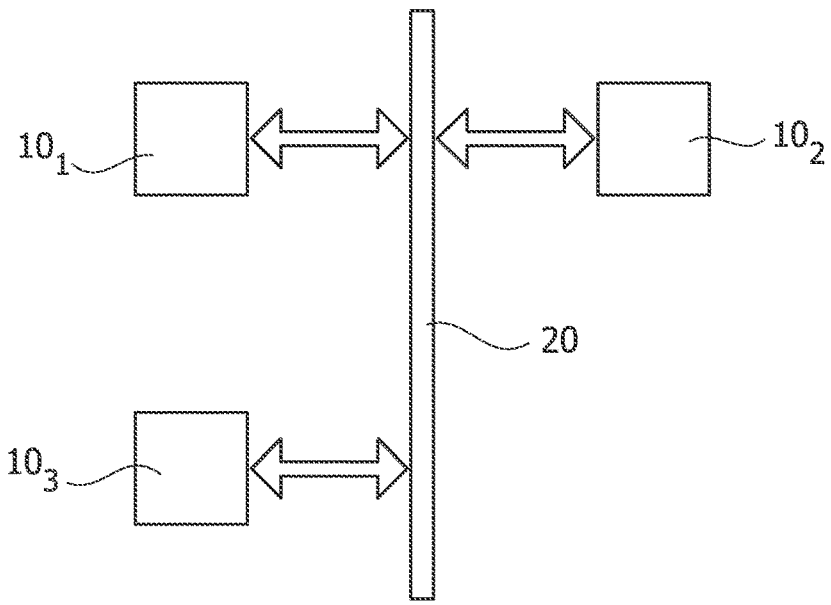
FIG. 1 shows an example of an electronic system.
Figure 2:
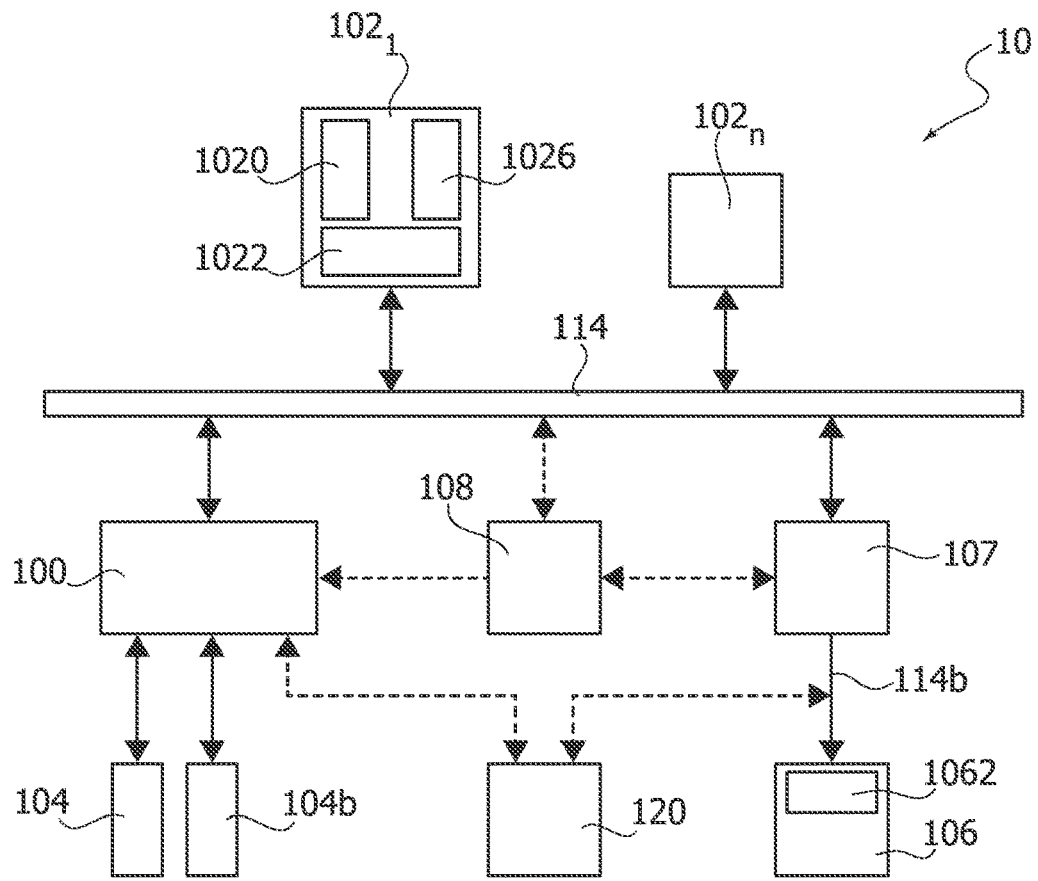
FIG. 2 shows an example of a processing system.
Figure 3:
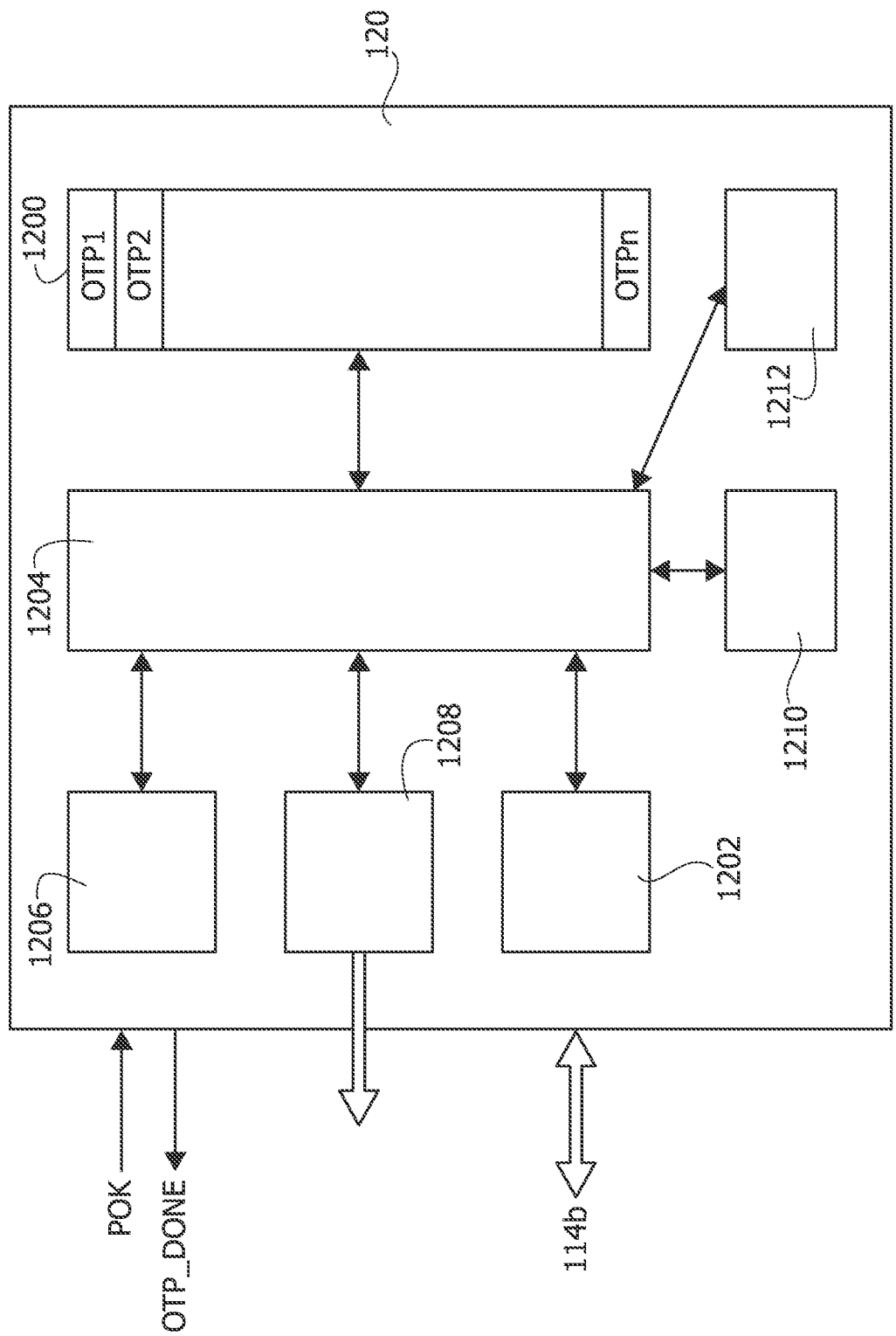
FIG. 3 shows an example of an OTP memory.

In the following FIGS. 4 to 11 parts, elements or components which have already been described with reference to FIGS. 1 to 3 are denoted by the same references previously used in such Figure; the description of such previously described elements will not be repeated in the following in order not to overburden the present detailed description.

As mentioned before, various embodiments of the present disclosure provide solutions for managing an OTP memory. Reference can be made to the previous description of FIGS. 1 to 3 for a general description of an OTP memory and a processing system comprising such an OTP memory.

Figure 4:
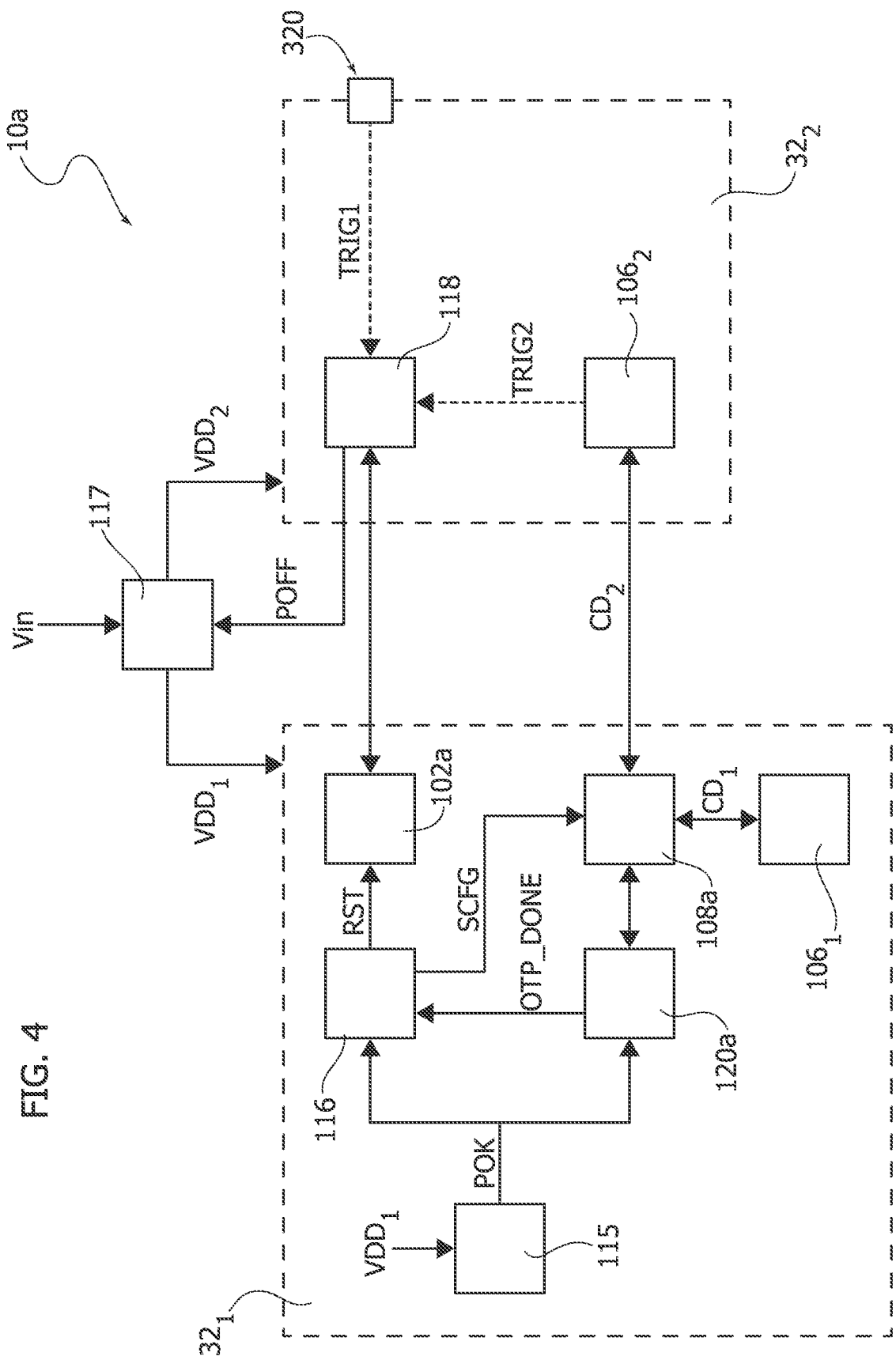
FIG. 4 shows an embodiment of a processing system.

FIG. 4 shows an embodiment of a processing system 10a according to the present disclosure.

As mentioned before, the present disclosure relates specifically to processing system 10a adapted to be switched off at least in part. For example, for this purpose, the processing system 10a comprise typically two sub-circuits:
  a first sub-circuit $32_1$ comprising circuits to be switched off; and
  a second sub-circuit $32_2$ comprising circuits, which are maintained enabled/switched-on, so called always-on domain.

In the embodiment considered, the processing system 10a comprises thus a power supply circuit 117 configured to generate a first supply voltages $VDD_1$ for the first sub-circuit $32_1$ and a second supply voltages $VDD_2$ for the first sub-circuit $32_2$. For example, for this purpose the power supply circuit 117 may receive an input voltage Vin, such as a voltage provided by a battery. Specifically, once the supply voltage Vin is received, the power supply circuit 117 generates the supply voltage $VDD_2$. For example, the voltage $VDD_2$ may correspond to the voltage Vin. However, the power supply circuit 117 may also comprise a voltage source, such as an electronic converter, configured to generate a regulated voltage $VDD_2$ based on the input voltage Vin. Moreover, the power supply circuit 117 is configured to generate the voltage $VDD_1$. However, in this case, the power supply circuit 117 is configured to provide the voltage $VDD_1$ only when a signal POFF has a given logic level/is de-asserted, e.g., when the signal POFF is set to low. For example, in the simplest case, the voltage $VDD_1$ may be provided via an electronic switch, which is connected to the voltage $VDD_2$ and closed when the signal POFF has the given logic level/is de-asserted. In general, the voltages $VDD_1$ and $VDD_2$ may have the same value or different values, e.g., the value of voltage $VDD_2$ may be smaller than the value of the voltage $VDD_1$.

For example, in the embodiment considered, the first sub-circuit $32_1$ comprises a processing core 102a, one or more resources $106_1$, an OTP memory 120a and a hardware configuration circuit 108a. For a more detailed description of the connection between these circuits may be made reference to the description of FIGS. 2 and 3. In this respect, the communication system 114/114b and/or the memory controller(s) 100 may be included in the sub-circuit $32_1$ or the sub-circuit $32_2$.

Specifically, in the embodiment considered, the first sub-circuit $32_1$ comprises also a power supply monitoring circuit 115 configured to assert a signal POK when the supply voltage $VDD_1$ exceeds a given threshold value, i.e., when the first sub-circuit $32_1$ is supplied. In response to this signal POK, the OTP memory 120a preloads the shadow-registers 1208 of the OTP memory 120a and once having preloaded the shadow-registers 1208, the OTP memory 120a asserts the signal OTP_DONE (see also the description of FIG. 3).

In the embodiment considered, the signals POK and OTP_DONE are provided to a reset management circuit 116. Specifically, in the embodiment considered, the reset management circuit 116 is configured to:
  in response to the signal POK, start a reset phase by asserting a reset signal RST provided to the processing core 102a and possibly one or more further reset signals used to reset the registers of one or more of other circuits of the first sub-circuit $32_1$, such as one or more resources/peripherals $106_1$;
  in response to the signal OTP_DONE, start a configuration phase by asserting a signal SCFG, wherein the hardware configuration circuit 108a reads, in response to the signal SCFG, one or more data from the OTP memory 120; and
  once the hardware configuration circuit 108a has read the data from the OTP memory 120, e.g., in response to a signal ECFG provided by the hardware configuration circuit 108 (not shown in FIG. 4), start a software run-time phase by de-asserting the reset signal RST provided to the processing core 102a.

Accordingly, in order to implement a low-power mode, the second sub-circuit $32_2$ may comprise a power management circuit 118. Specifically, in the embodiment considered, the power management circuit 118 is configured to assert the signal POFF in response to a request received from the first sub-circuit $32_1$, for example a request received from the processing core 102a. For example, for this purpose, the power management circuit 118 may be connected to the communication channel 114 or 114b, whereby the processing core 102a may request a switch-off by sending via software instructions a (write) request to the power management circuit 118. Accordingly, once having received the request, and the signal POFF is asserted, the power supply circuit 117 disables/switches off the voltage $VDD_1$ of the first sub-circuit 321, thereby switching off the respective circuits.

Conversely, in order to de-assert the signal POFF, the power management circuit 118 may monitor one or more signals indicating given events, such as one or more trigger signals, e.g.:
  a first trigger/event signal TRIG1 received via a terminal of the processing system 10a, such as a pin or pad of a respective integrated circuit; and/or
  a second trigger/event signal TRIG2 provided by a resource/peripheral in the sub-circuit $32_2$, such as a timer circuit, such as a watchdog timer, a communication interface, an analog comparator, etc.

Accordingly, in various embodiments, each resource/peripheral 106 of the processing system 10a may be either in the sub-circuit $32_1$ or the sub-circuit $32_2$. In various embodiments, the processing system 10a may be configured to permit for one or more of the resources/peripherals 106 a selection whether the respective resource/peripheral 106 belongs to the first sub-circuit $32_1$ (and are thus switched off) or to the second sub-circuit $32_2$ (and may thus be used to generate the trigger signal TRIG2).

Accordingly, in response to the event/trigger signal TRIG1 and/or TRIG2, the power management circuit 118 de-asserts the signal POFF, whereby the power-supply circuit 117 switches on again the supply voltage $VDD_1$, whereby the first sub-circuit $32_1$ is started again, thereby preloading the data to the shadow-registers 1208 and executing the reset, configuration and software runtime phase.

Figure 5:
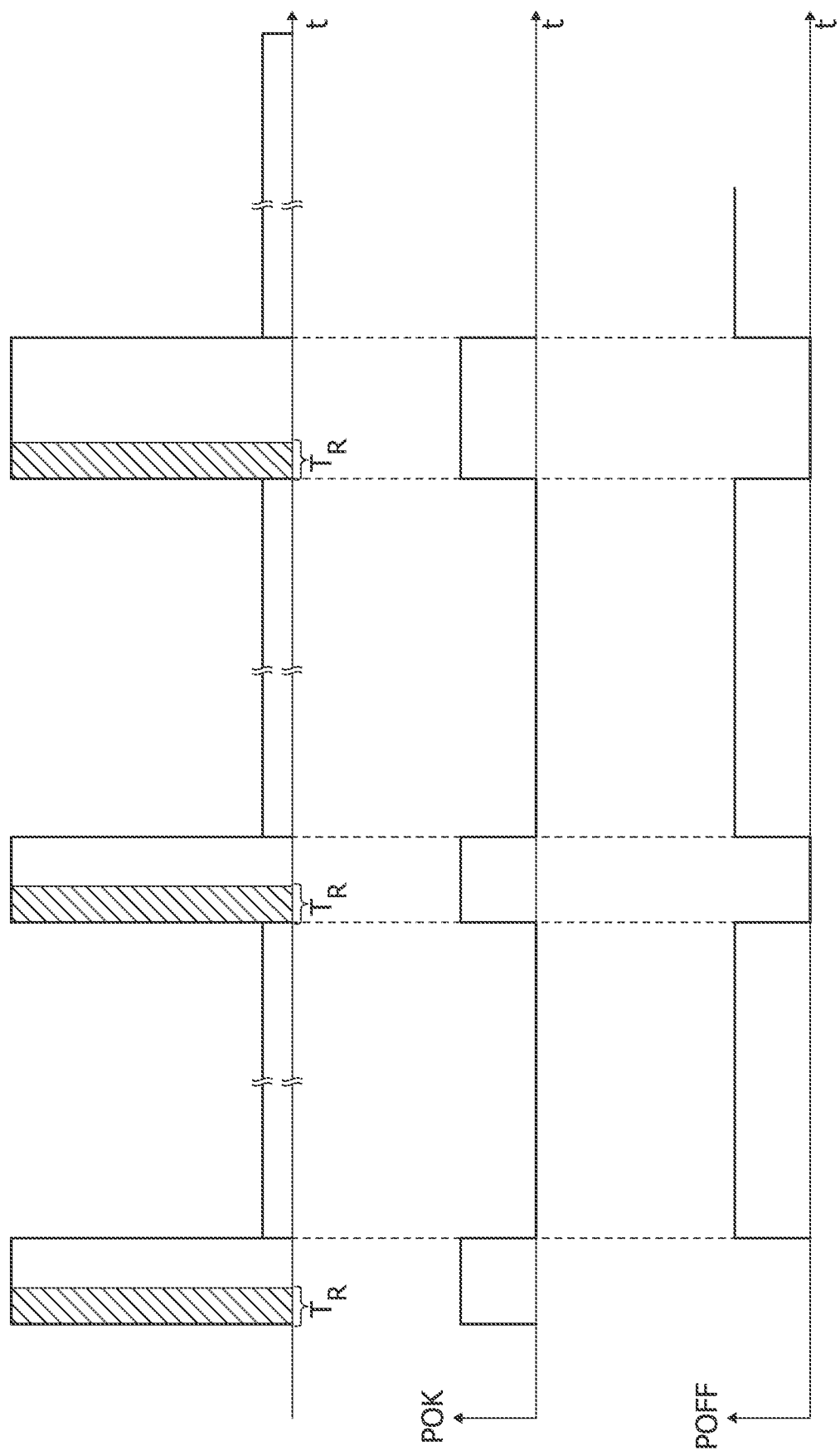
FIG. 5 shows an embodiment of the operation of the processing system of FIG. 4.

Accordingly, as shown in FIG. 5, once the processing system 10a (i.e., both sub-circuits $32_1$ and $32_2$) is switched on, the OTP memory 120a asserts the signal OTP_DONE only after a time $T_R$ used to preload the shadow-registers 1208. Once the power management circuit 118 asserts then the signal POFF, the first sub-circuit $32_1$ is switched off. However, when de-asserting the signal POFF (in response to an event), the power supply monitoring circuit 115 asserts again the signal POK, and the OTP memory 120 asserts the signal OTP_DONE again only after a time $T_R$ used to preload the shadow-registers 1208. This operation is thus repeated for each switch-on operation of the first sub-circuit 32$_1$.

However, as shown in FIG. 4, indeed the hardware configuration circuit 108*a* may provide a first set of configuration data CD$_1$ to circuits within the first sub-circuit 321, such as one or more resources 106$_1$. Moreover, the hardware configuration circuit 108*a* may provide a second set of configuration data CD$_2$ to circuits within the second sub-circuit 32$_2$, such as one or more resources 106$_2$. However, the second sub-circuit 32$_2$ is not switched off, whereby the respective circuits do not lose the configuration data CD$_2$. Moreover, also the circuits within the first sub-circuit 32$_1$ may not use always all configuration data, e.g., in case the cryptographic co-processor is not used.

Accordingly, in various embodiments, the OTP memory 120*a* permits to specify which data should be preloaded, in response to the signal POK, from the OTP memory areas 1200 to the shadow-registers 1208.

Figure 6:
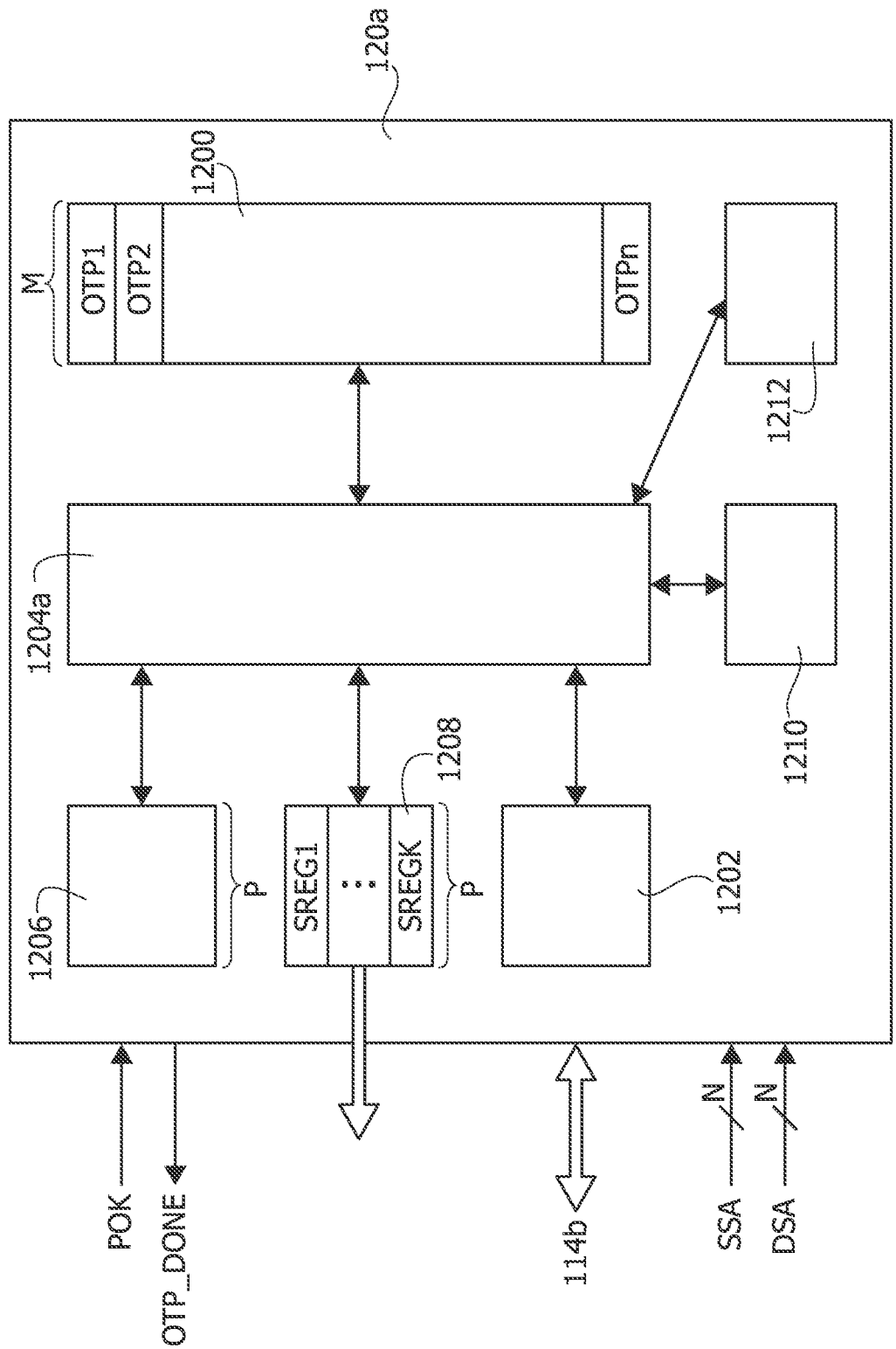
FIG. 6 shows an embodiment of an OTP memory according to the present disclosure.

FIG. 6 shows an embodiment of an OTP memory 120*a* according to the present disclosure.

In the embodiment considered, the OTP memory 120*a* comprises:
- a memory area 1200 having a given number N of memory slots, i.e, slots OTP1, . . . , OTPN;
- a given number of K shadow-registers SREG, i.e, registers SREG1, . . . , SREGK, wherein the number K is smaller than the number N;
- a (shared) register 1206;
- a communication interface 1202, such as a communication interface for connecting the OTP memory 120*a* to the peripheral bus 114*b*;
- a control circuit 1204*a*.

In various embodiments, the OTP memory 120*a* may also comprise the optional interfaces 1210 and/or 1212.

Specifically, as schematically shown in FIGS. 6, each memory slot of the OTP memory area 1200 has a given number M of bits, e.g., implemented with respective fuses or similar one-time programmable storage elements. Conversely, each shadow-register SREG (a similarly the register 1206) has a given number P of bits. Generally, the number P may correspond to the number M, i.e., all bits of a given OTP memory slot are transferred to the respective shadow-register SREG, or the number P may be smaller than the number M. For example, the latter solution is usually preferably, because the bits stored to a given memory slot of the memory area 1200 may comprise additional error detection and optionally correction data. For example, the data may be stored in a redundant manner to memory area 1200. For example, each bit of a given data word may be stored a plurality of times to the respective memory slot. For example, 32 bits of data may indeed be stored to a memory slot having 128 bits, wherein each bit is stored to four respective OTP storage elements. However, also more complex error-correction codes (ECC) may be used, wherein one or more ECC bits are added to the data, or the data are stored in an encoded form. Accordingly, in various embodiments, the control circuit 1204*a* may be configured to transfer data from a given memory slot to a shadow-register SREG (or similarly the shared register 1206) by:
- reading the M bits from the memory slot,
- extracting P bits of data from the M bits read from the memory slot, e.g., by using an error correction code or decoding the M bits, and
- storing the extracted P bits (corresponding to the actual data) to a respective shadow-register SREG (or the shared register 1206).

Accordingly, in case the control circuit 1204*a* is also configured to write data to the OTP memory area 1200, e.g., by storing via the communication interface 1202 (or another communication interface of the OTP memory 120*a*) respective data to a shadow-register SREG or the shared register 1206, the control circuit may be configured to transfer the respective data to a given memory slot by:
- reading the P bits from the register,
- generating M bits by encoding the P bits of data or adding ECC bits to the P bits; and
- storing the P bits to the respective memory slot.

For example, when each bit of the P bits of data should be programmable individually (bit-programmable), the M bits comprise preferably redundant bits for each of the P bits, such as at least two further redundant bits. Conversely, in case only the complete word may be written (word programmable), also other ECC schemes may be used.

In addition to managing the read and write requests received via the interface(s) of the OTP memory 120*a*, the control circuit 1204*a* also manages a preload mechanism. Specifically, in the embodiment considered, the OTP memory 120*a*, and in particular the control circuit 1204*a* of the OTP memory 120*a*, receives for this purpose the signal POK and a shadow-register selection signal SSA.

Specifically, in the embodiment considered, the signal SSA indicates the mapping of the K shadow-registers SREG to the N memory slots of the memory area 1200.

Figure 7:
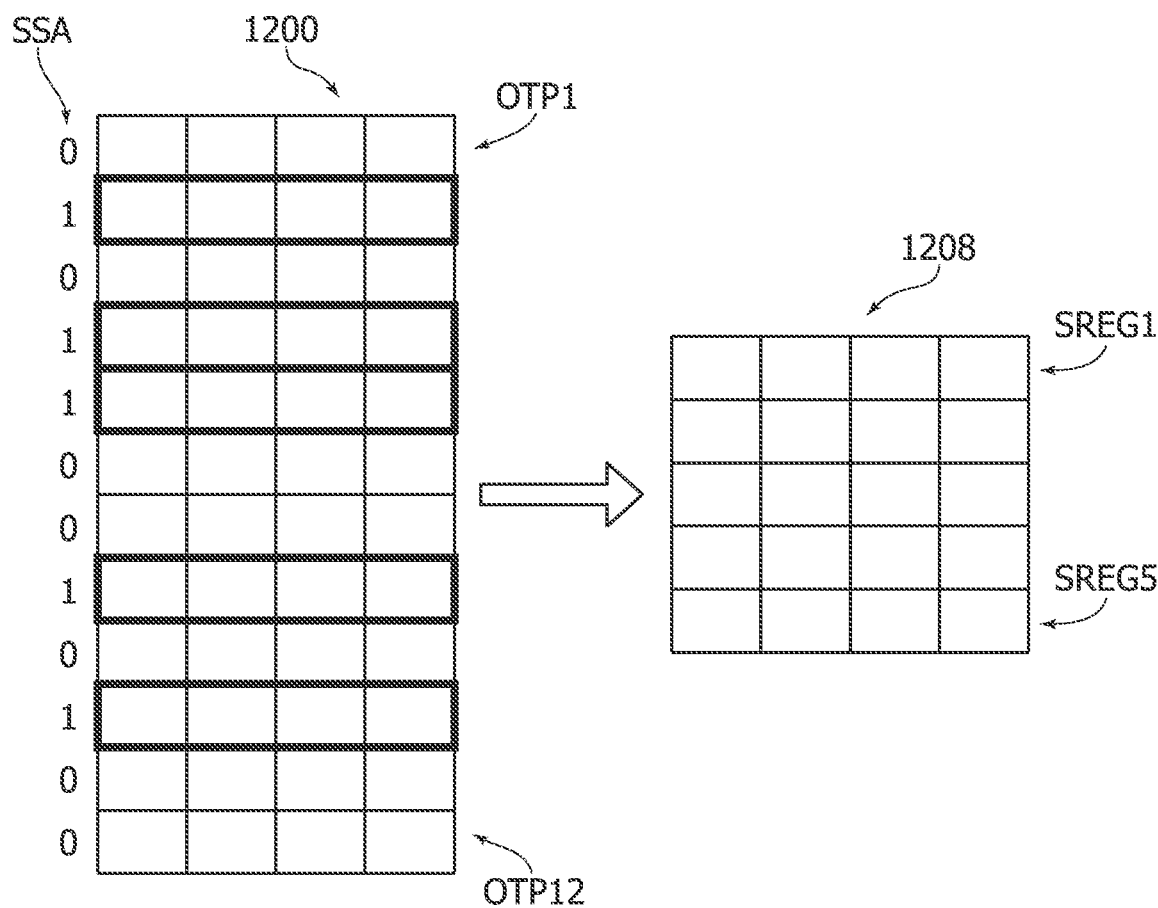
FIGS. 7-10 show embodiments of the operation of the OTP memory of FIG. 6.

For example, FIG. 7 shows an embodiment, wherein the signal SSA has N bits, wherein each bit is associated univocally with a given memory slot and indicates whether the data of the respective memory slot should be transferred to a respective shadow-register.

For example, in FIG. 7 are shown twelve memory slots OTP1, . . . , OTP12 and five shadow-registers SREG1, . . . , SREG5. For example, in this case, the bit sequence "00101001010" may indicate that the memory slots OTP2, OTP4, OTP5, OTP8 and OTP10 should be transferred. For example, in various embodiments, the shadow-registers SREG are assigned sequentially to the selected memory slots, i.e., the control circuit 1204*a* may select the following assignment:
- the shadow-register REG1 is associated with the memory slot OTP2,
- the shadow-register REG2 is associated with the memory slot OTP4,
- the shadow-register REG3 is associated with the memory slot OTP5,
- the shadow-register REG4 is associated with the memory slot OTP8, and
- the shadow-register REG5 is associated with the memory slot OTP10.

Accordingly, in the embodiment considered, up to 5 bits may be asserted of the signal SSA.

In the embodiment considered, the control circuit 1204*a* may thus use the signal SSA in order to determine the mapping between memory slots and the shadow-registers. For example, when receiving a read request requesting the data stored to a given memory slot, the control circuit 1204*a* may use the signal SSA in order to determine whether the data of the respective slot are also stored to a shadow-register and:
- when the signal SSA indicates that the data of the respective slot are also stored to a shadow-register, transmit the data stored to the shadow-register, i.e., without performing a further read operation to the memory area 1200; and when the signal SSA indicates that the data of the respective slot are not stored to a shadow-register, transfer the data of the memory slot to the shared register 1206 and then transmit the data stored to the shared register 1206.

Accordingly, in the embodiment considered, the duration of the preload phase may be reduced, by enabling via the signal SSA only the preloading of data, which are also expected to be used by the processing system 10*a* during the next operation interval when the sub-circuit 32$_1$ is switched on.

However, the inventors have observed that the use of the signal SSA alone may have several disadvantages. For example, on the one hand, this implies that given memory slots, which are not required for the boot of the processing system 10*a* may be read later on and even several times, whereby access times are significantly increased, because the data of the respective memory slot are not stored to a respective shadow-register.

Moreover, as mentioned before, the location of given data in the shadow-registers should also be fixed, e.g., because the OTP memory 120*a* may also provide the data of one or more of the shadow-registers directly. For example, a shadow-register may be arranged to store the MAC address of an Ethernet communication interface 106, whereby this shadow-register is directly connected to the Ethernet communication interface 106. In this context, the signal SSA may also be a static signal prior to the synthesis operation of the control circuit 1204*a*, whereby the respective combination logic circuit may be implemented in an optimized manner via the logic synthesis operation.

Accordingly, in various embodiments, the shadow-register selection signal SSA is used as a static signal, and is thus also identified as static shadow array signal. For example, based on the application, this signal may be hardwired within the processing system 10*a* or may be a static signal prior to the logic synthesis operation, thereby specifying permanently a given mapping of the shadow-registers 1208 to the memory area 1200. Conversely, the OTP memory 120*a*, in particular the control circuit 1204*a*, is configured to receive a further signal DSA specifying, which of the shadow-registers 1208 should be preloaded in response to the signal POK, i.e., the signal DSA specifies dynamically the preloading of the shadow-registers and is also identified as dynamic shadow array signal.

Figure 8:
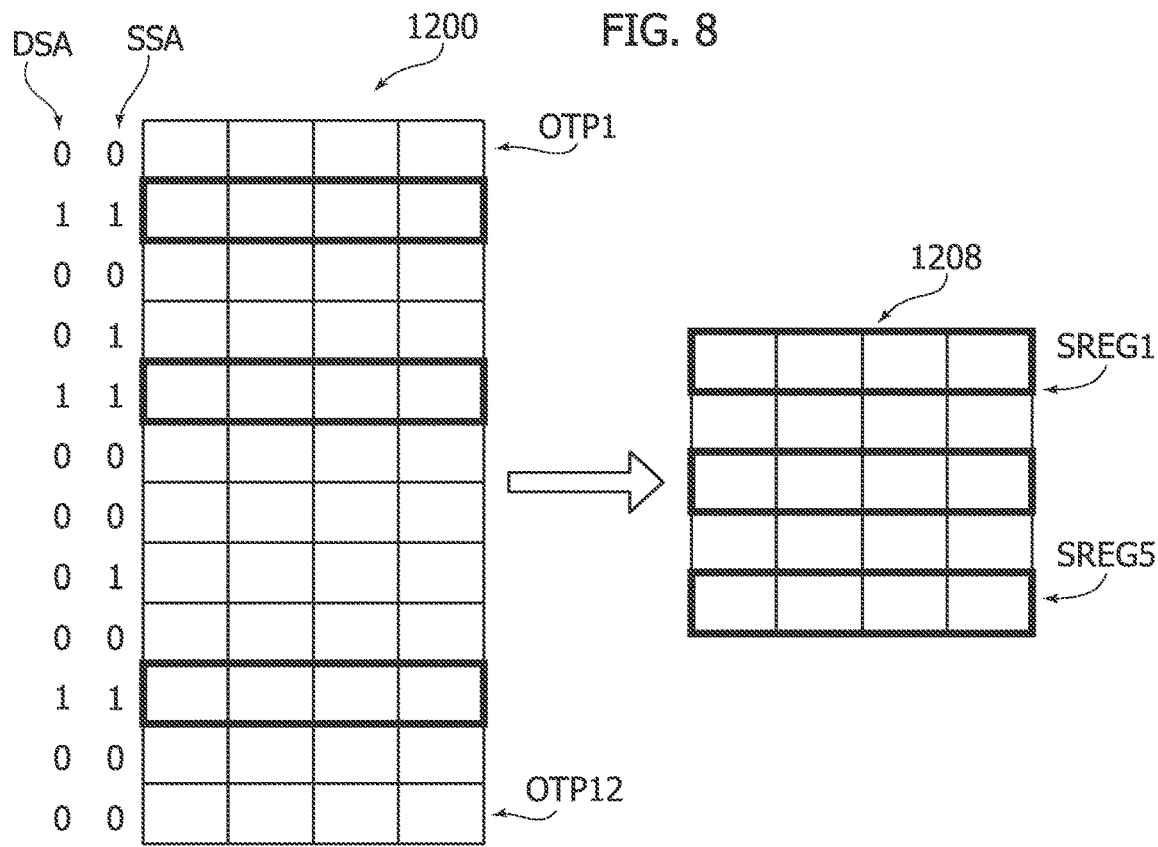

For example, FIG. 8 shows an embodiment, wherein the signal DSA has N bits, wherein each bit is associated univocally with a given memory slot and indicates whether the data transfer of the respective memory slot to the respective shadow-register (as indicated by the signal SSA) is enabled.

For example, for the exemplary situation shown in FIG. 8, the bit sequence "001010011010" of the signal SSA may again indicate that the memory slots OTP2, OTP4, OTP5, OTP8 and OTP10 are mapped to respective shadow-registers SREG1-SREG5. Moreover, the bit sequence "001000010010" of the signal DSA indicates that indeed only the memory slots OTP2, OTP5 and OTP10 should be preloaded. Accordingly, in the embodiment considered, while the shadow-registers SREG2 and SREG4 are mapped (via the signal SSA) to the memory slots OTP4 and OTP8, respectively, the control circuit 1204*a* does not preload these shadow-registers, but—if required—the control circuit 1204*a* may load these shadow-registers only once a read request to the respective memory slot (OTP4 or OTP8) is received.

Figure 9:
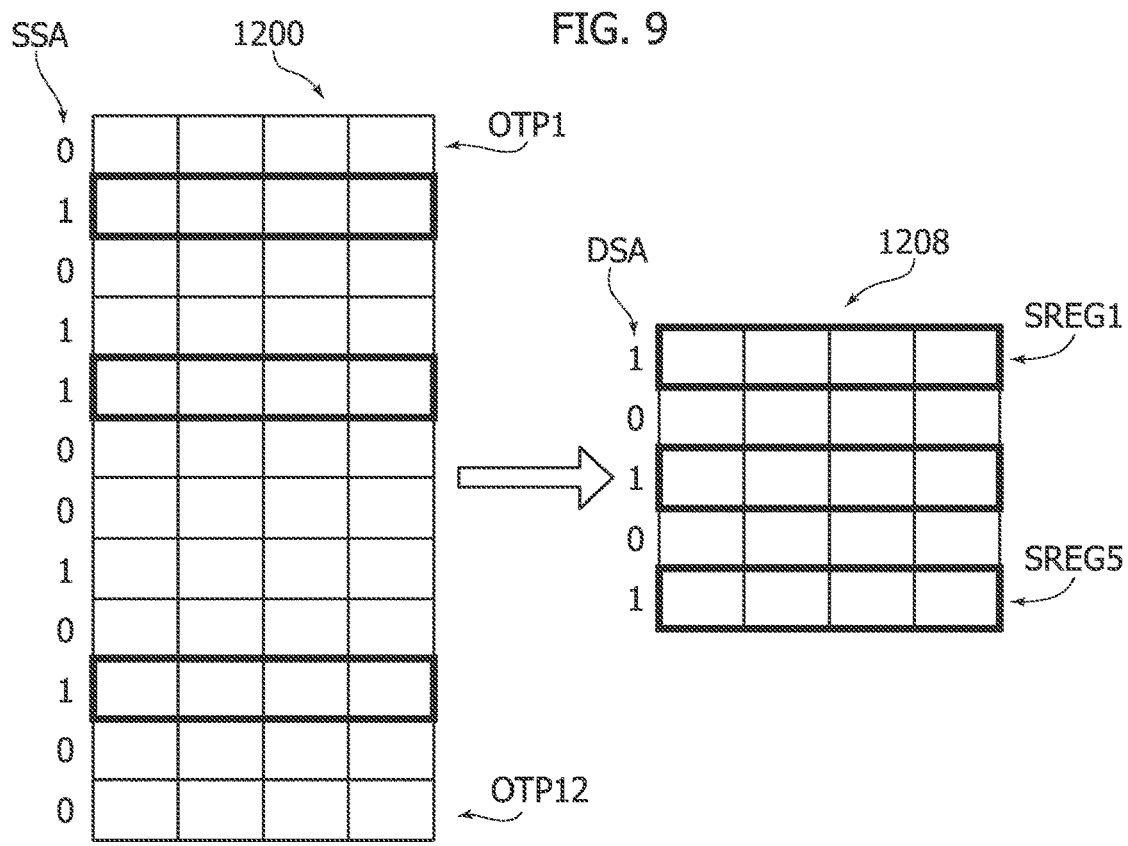

Conversely, FIG. 9 shows an embodiment, wherein the signal DSA has K bits, wherein each bit is associated univocally with a given shadow-register SREG and indicates whether the data transfer of the respective memory slot to the respective shadow-register (as indicated by the signal SSA) is enabled.

For example, for the exemplary situation shown in FIG. 8, the bit sequence "001010011010" of the signal SSA may again indicate that the memory slots OTP2, OTP4, OTP5, OTP8 and OTP10 are mapped to respective shadow-registers SREG1-SREG5. Moreover, the bit sequence "10101" of the signal DSA indicates that indeed only the shadow-registers SREG1, SREG3 and SREG5 should be preloaded based on the data stored to the memory slots OTP2, OTP5 and OTP10 (as indicated via the signal SSA). Accordingly, also in this case, the shadow-registers SREG2 and SREG4 are mapped (via the signal SSA) to the memory slots OTP4 and OTP8, respectively, and the control circuit 1204*a* does not preload these shadow-registers, but—if required—the control circuit 1204*a* may load these shadow-registers only once a read request to the respective memory slot (OTP4 or OTP8) is received.

Figure 10:
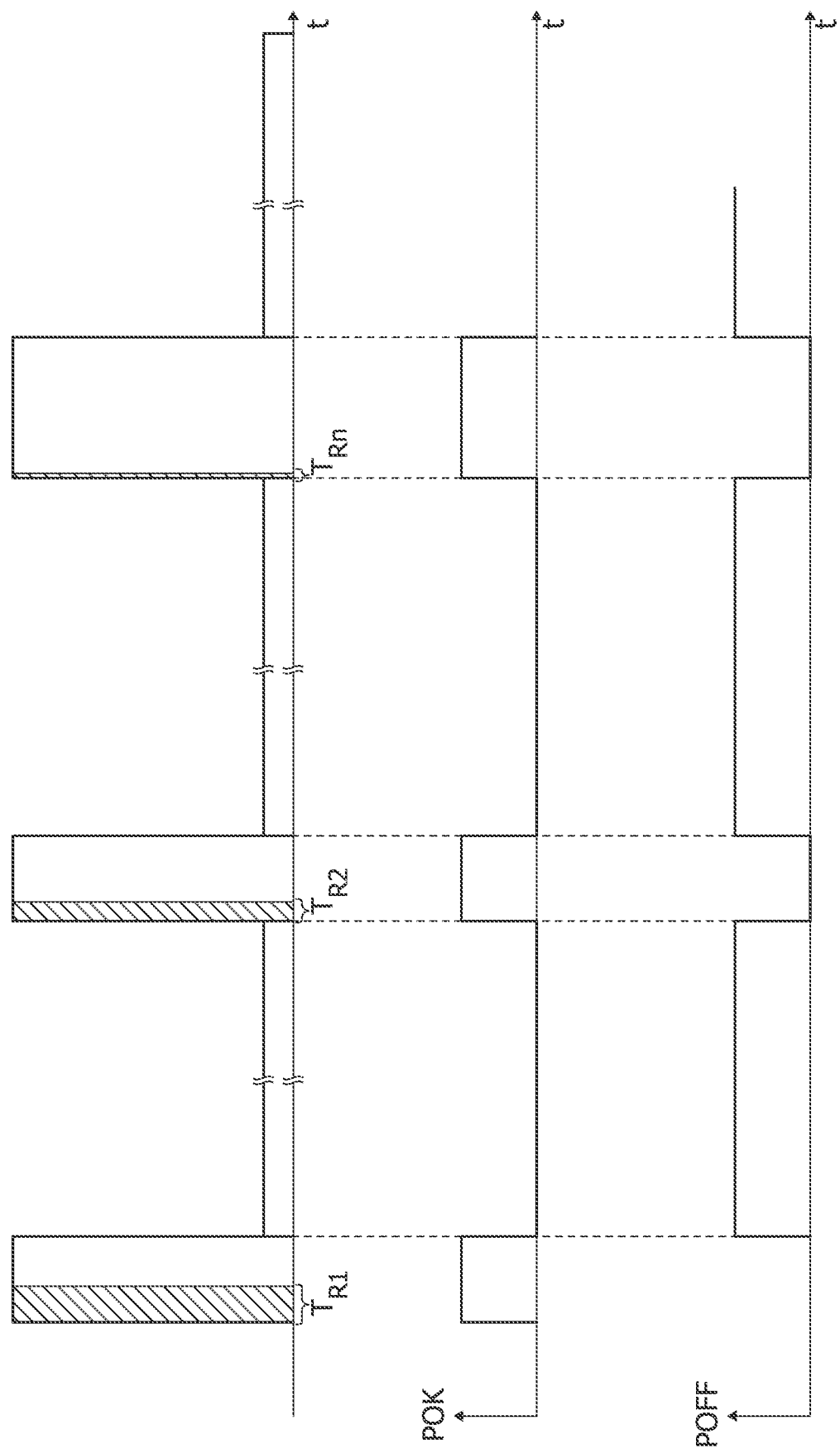

Accordingly, as shown in FIG. 10, once the processing system 10*a* (i.e., both sub-circuits 32$_1$ and 32$_2$) is switched on, the OTP memory 120*a* asserts the signal OTP_DONE after a time $T_{R1}$ used to preload the shadow-registers 1208, which depends on the number of shadow-registers 1208, which are preloaded. For example, once the processing system is switched on, the signal DSA may correspond to the signal SSA, whereby all shadow-registers 1208 are preloaded, and at least part of these data is transferred to the other circuits of the processing system 10*a*. Once the power management circuit 118 asserts then the signal POFF, the first sub-circuit is switched off. When de-asserting the signal POFF (in response to an event), the power supply monitoring circuit 115 asserts again the signal POK. However, this time, the signal DSA may have less bits asserted, whereby less data are preloaded and the OTP memory 120 asserts the signal OTP_DONE after a time $T_{R2}$ used to preload less shadow-registers 1208.

Figure 11:
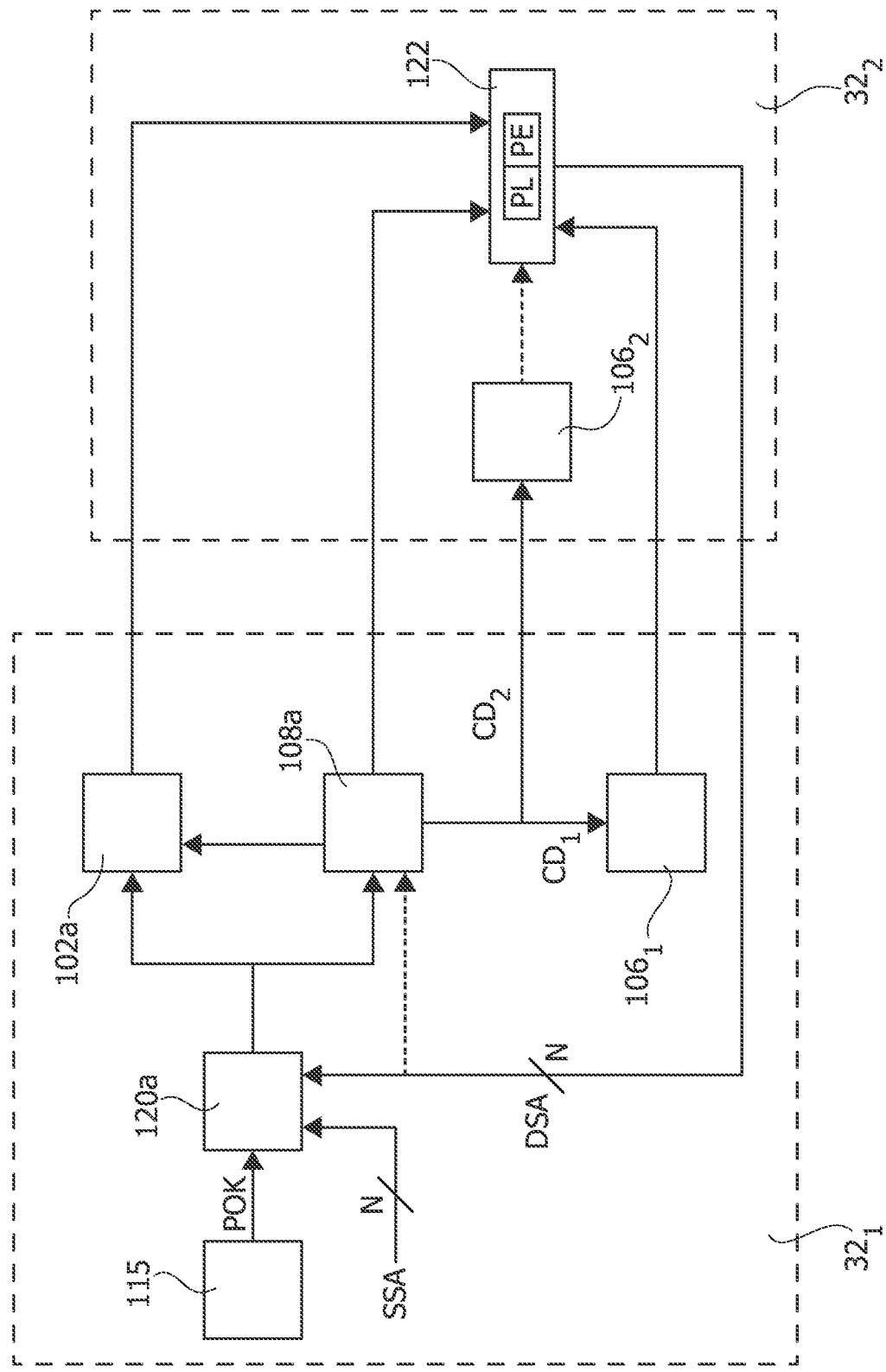
FIG. 11 shows an embodiment of a processing system according to the present disclosure.

FIG. 11 shows in this respect an embodiment of a processing system 10*a* configured to generate the signals SSA and DSA.

Specifically, as mentioned before, the signal SSA may be hardwired or may just be a static signal used for the logic synthesis operation, e.g., in the context of a VHDL or Verilog model. Alternatively, in various embodiments, the signal SSA may be determined as a function of the data stored to a non-volatile memory. For example, in various embodiments, the control circuit 1204*a* is configured to determine the signal SSA based on the content of one or more memory slots of the OTP memory area 1200.

Conversely, in the embodiment considered, the signal DSA is provided by a circuit 122.

Specifically, as mentioned before, the data stored to the shadow-registers of the OTP memory 120*a* may be read by a processing core 102*a* and/or the hardware configuration circuit 108*a*.

For example, as schematically shown in FIG. 11, the hardware configuration circuit 108*a* may transfer configuration data CD$_1$ to one or more resources 106$_1$ in the sub-circuit 32$_1$ and configuration data CD$_2$ to one or more resources 106$_2$ in the sub-circuit 32$_2$. In this case, it may be useless to re-transmit the configuration data $CD_2$ to the resources $106_2$ when just the sub-circuit $32_1$ is switched off.

Accordingly, in various embodiments, the circuit 122 may comprise for one or more bits of the signal DSA a respective register (or a respective set of redundant registers), and the hardware configuration circuit 108*a* may be configured to de-assert the bits associated with the configuration data $CD_2$, whereby the respective memory slots of the OTP memory 120*a* are not preloaded at the next re-activation of the sub-circuit $32_1$. Conversely, when the complete processing system is switched off, also the registers of the circuit 122 will lose the stored data, whereby the signal DSA is reset. For example, in various embodiments, the circuit 122 is configured to provide, once having been reset, as signal DSA the same bit sequence as the signal SSA. For example, for this purpose, the signal SSA may also be provided to the circuit 122.

Similarly, the processing core 102*a* may be configured to program one or more of the registers of the circuit 122 in order to set the signal DSA. For example, for this purpose, the circuit 122 may be connected to the communication system 114, e.g., via the communication system 114*b*.

Additionally or alternatively, as schematically shown in FIG. 11, in various embodiments, the circuit 122 may be configured to determine at least part of the logic levels of bits of the signal DSA as a function of signals received from one or more of the resources 106, in particular the resources $106_2$. For example, one or more of the resources 106 may be configured to provide a signal indicating whether the respective resource has still stored to respective configuration data. Accordingly, in this case, one the sub-circuit $32_1$ is re-activated, a resource $106_2$ may indicate that it still has valid configuration data, while a resource $106_1$ may indicate that it does not have valid configuration data.

Generally, the above solutions may also be combined. For example, as schematically shown in FIG. 11, the circuit 122 may be configured to assert or de-assert a respective flag PL based on a signal provided by a resource 106 or programmed via the configuration circuit 108*a*, wherein this signal indicates that the respective configuration data are valid or invalid. Conversely, the processing core 102*a* may be configured to program a flag PE used to indicate whether the preload mechanical for the respective configuration data is enabled or disabled. Accordingly, in this case, the circuit 122 may be configured to:

assert the respective bit of the signal DSA when the flag PL indicates that the respective configuration data are invalid and the flag PE indicates that preload mechanical for the respective configuration data is enabled; and de-assert the respective bit of the signal DSA when the flag PL indicates that the respective configuration data are valid or the flag PE indicates that preload mechanical for the respective configuration data is disabled.

For example, in this way, when the processing system 10*a* is switched on, the signal SSA may indicate that the memory slot comprising a MAC address should be preloaded to a given shadow-register 1208. Accordingly, in response to the signal POK, the control circuit 1204*a* uses the signals SSA and DSA to preload the shadow-registers. Specifically, due to the fact that the signal DSA has its reset value, the control circuit 1204*a* preloads the MAC address from the memory area 1200 to the respective shadow-register 1208. Once having finished the preloading of the shadow-registers, the control circuit 1204*a* asserts the signal OTP_DONE.

In case the hardware configuration circuit 108*a* is provided/used, the reset management circuit 116 may then assert the signal SCFG. In response to this signal, the hardware configuration circuit 108*a* reads the MAC address from the OTP memory and transmits the MAC address to an Ethernet communication interface 106 within the sub-circuit $32_2$ of the processing system 10*a*. Moreover, the hardware configuration circuit 108*a* may program a respective flag in the circuit 122.

Alternatively, the shadow-register 1208 may also be connected directly to the Ethernet communication interface 106. In this case, the Ethernet communication interface 106 may directly signal to the circuit 122 that the MAC address is valid.

Accordingly, when the processing system 10*a* actives the low power mode, wherein the sub-circuit $32_1$ is switched off, the Ethernet communication interface 106 will maintain the MAC address. Accordingly, once the sub-circuit $32_1$ is switched on again, the signal SSA again indicates that the memory slot comprising a MAC address should be preloaded to the same shadow-register 1208. Accordingly, in response to the signal POK, the control circuit 1204*a* uses the signals SSA and DSA to preload the shadow-registers. Specifically, this time the bit associated with the memory slot containing the MAC address is de-asserted, whereby, the control circuit 1204*a* omits the preloading of the MAC address from the memory area 1200 to the respective shadow-register 1208. Once having finished the preloading of the shadow-registers, the control circuit 1204*a* asserts again the signal OTP_DONE.

In case the hardware configuration circuit 108*a* is provided/used, the reset management circuit 116 may then assert again the signal SCFG. As shown in FIG. 11, in this case, the signal DSA or another similar signal is also provided to the hardware configuration circuit 108*a*. In this way, in response to the signal POK, also the hardware configuration circuit 108*a* omits the reading of the MAC address from the OTP memory.

Alternatively, when the shadow-register 1208 is connected directly to the Ethernet communication interface 106, the Ethernet communication interface 106 may simply not request the data from the shadow-register because the MAC address is still valid.

Of course, without prejudice to the principle of the invention, the details of construction and the embodiments may vary widely with respect to what has been described and illustrated herein purely by way of example, without thereby departing from the scope of the present invention, as defined by the ensuing claims. For example, while in the previous description a software programmable processing core comprising a micro-processor has been used, also any other digital processing core may be used.

What is claimed is:

1. A One-Time Programmable (OTP) memory controller comprising:
   a data register;
   a given number K of shadow-registers, wherein the number K is smaller than a given number N of memory slots of an OTP memory area;
   a communication interface configured to receive a read request requesting data of a memory slot; and
   a control circuit configured to receive a preload start signal and a shadow-register preload enable signal, wherein the control circuit is configured to manage a preload phase and a data-read phase,
   wherein, in response to the preload start signal, the control circuit is configured to perform the preload phase by:
      determining a mapping between the given number K of shadow-registers and the given number N of memory slots, determining, for each of the given number K of shadow-registers, whether a shadow-register is pre-loadable as a function of the shadow-register preload enable signal, in response to determining that the shadow-register is preloadable, transferring the data from the memory slot mapped to the shadow-register, the respective memory slot being mapped to the shadow-register, and once the shadow-register is preloaded based on the shadow-register preload enable signal, asserting a preload end signal and starting the data-read phase, and wherein the control circuit is configured to perform the data-read phase by:

selecting a memory location indicated in the read request, determining whether the selected memory location is mapped to the shadow-register, in response to determining that the selected memory location is mapped to the shadow-register, selecting the shadow-register mapped to the selected memory location and determining whether the selected shadow-register has been pre-loaded, in response to determining that the selected shadow-register has been pre-loaded, transmitting the data stored in the selected shadow-register via the communication interface, in response to determining that the selected shadow-register has not been pre-loaded, transferring the data from a selected memory slot to the selected shadow-register and then transmitting the data stored in the selected shadow-register via the communication interface, and in response to determining that the selected memory location is not mapped to the shadow-register, transferring the data from the selected memory slot to the data register and then transmitting the data stored in the data register via the communication interface.

2. The OTP memory controller according to claim 1, wherein the control circuit is configured to:

receive a shadow-register mapping signal; and determine the mapping between the given number K of shadow-registers and the given number N of memory slots as a function of the shadow-register mapping signal.

3. The OTP memory controller according to claim 1, wherein the shadow-register preload enable signal comprises a given number N of bits, and wherein each bit indicates whether a respective memory slot is preloadable.

4. The OTP memory controller according to claim 1, wherein the shadow-register preload enable signal comprises a given number K of bits, and wherein each bit indicates whether a respective shadow register is preloadable.

5. The OTP memory controller according to claim 1, wherein the control circuit is configured to perform a data-write phase by:

receiving a write request via the communication interface and selecting a respective memory location indicated in the write request, wherein the write request comprises respective data to be stored to the selected memory location;

determining whether the selected memory location is mapped to a respective shadow-register;

in response to determining that the selected memory location is mapped to the respective shadow-register, selecting the respective shadow-register mapped to the selected memory location, storing the data to be stored in the selected respective shadow-register and programming the data stored in the selected respective shadow-register to the selected memory location; and in response to determining that the selected memory location is not mapped to the respective shadow-register, storing the data to be stored to the data register and programming the data stored to the data register to the selected memory location.

6. A processing system comprising:

a power supply circuit configured to receive an input voltage and provide a first supply voltage and a second supply voltage, wherein the power supply circuit is configured to selectively enable the first supply voltage when a low-power control signal is de-asserted and disable the first supply voltage when the low-power control signal is asserted;

a first sub-circuit configured to receive the first supply voltage, wherein the first sub-circuit comprises:
the OTP memory area comprising the given number N of memory slots; and
the OTP memory controller according to claim 1, wherein the OTP memory controller is configured to manage the OTP memory area; and a second sub-circuit configured to receive the second supply voltage.

7. The processing system according to claim 6, further comprising a power supply monitoring circuit configured to assert the preload start signal when the first supply voltage exceeds a given threshold voltage.

8. The processing system according to claim 7, further comprising:

a digital processing circuit;

a first resource connected to the digital processing circuit and configured to receive first configuration data; and a reset management circuit configured to, in response to the preload end signal, start the digital processing circuit.

9. The processing system according to claim 8, wherein the second sub-circuit comprises:

a power management circuit configured to generate the low-power control signal, and a second resource connected to the digital processing circuit and configured to receive second configuration data.

10. The processing system according to claim 9, wherein the power management circuit is configured to:

in response to a request received from the digital processing circuit, assert the low-power control signal, and in response to an event signal, de-assert the low-power control signal.

11. The processing system according to claim 6, wherein the OTP memory controller is configured to map a first memory slot of the OTP memory area storing first configuration data to a first shadow-register and a second memory slot of the OTP memory area storing second configuration data to a second shadow-register.

12. The processing system according to claim 6, wherein the processing system is configured to:

in response to switching-on the processing system, assert the preload start signal via a power supply monitoring circuit and set the preload enable signal in order to preload first configuration data from a first memory slot to a first shadow-register and second configuration data from a second memory slot to a second shadow-register and, in response to the preload end signal, transfer the first configuration data from the first shadow-register to a first resource and the second configuration data from the second shadow-register to the second resource;

send via a digital processing circuit a request to a power management circuit in order to assert the low-power control signal thereby disabling the first supply voltage and switching off the first sub-circuit;

in response to an event signal, de-assert the low-power control signal via the power management circuit thereby enabling the first supply voltage and switching on the first sub-circuit; and in response to switching on the first sub-circuit, assert the preload start signal via the power supply monitoring circuit and set the preload enable signal in order to preload the first configuration data from the first memory slot to the first shadow-register and disable the preloading of the second configuration data from the second memory slot to the second shadow-register and, in response to the preload end signal, transfer the first configuration data from the first shadow-register to the first resource and inhibit the transfer of the second configuration data from the second shadow-register to the second resource.

13. The processing system according to claim 6, wherein the processing system is configured to set a shadow-register mapping signal in order to map a first memory slot of the OTP memory area storing first configuration data to a first shadow-register and a second memory slot of the OTP memory area storing second configuration data to a second shadow-register.

14. The processing system according to claim 6, further comprising a circuit configured to generate the preload enable signal.

15. The processing system according to claim 14, wherein the circuit is configured to generate the preload enable signal as a function of at least one of:
  a first signal received from a first resource, wherein the first signal indicates whether the first resource has stored first configuration data;
  a second signal received from a second resource, wherein the second signal indicates whether the second resource has stored second configuration data;
  a third signal received from a configuration circuit configured to transfer first configuration data from a first shadow-register to the first resource and the second configuration data from a second shadow-register to the second resource, wherein the third signal indicates whether the first configuration data have been transferred from the first shadow-register to the first resource and/or whether the second configuration data have been transferred from the second shadow-register to the second resource; or
  a fourth signal received from a digital processing circuit, wherein the fourth signal indicates whether to pre-load the first configuration data and/or whether to pre-load the second configuration data.

16. The processing system according to claim 14 wherein the second sub-circuit comprises the circuit.

17. A method for operating a processing system, the method comprising:
  switching-on the processing system;
  in response to switching-on the processing system, asserting, by a power supply monitoring circuit of the processing system, a preload start signal and setting a preload enable signal in order to preload first configuration data from a first memory slot to a first shadow-register and second configuration data from a second memory slot to a second shadow-register;
  in response to a preload end signal, transferring the first configuration data from the first shadow-register to a first resource and the second configuration data from the second shadow-register to a second resource;
  sending, by a digital processing circuit of the processing system, a request to a power management circuit in order to assert a low-power control signal thereby disabling a first supply voltage and switching-off a first sub-circuit;
  in response to an event signal, de-asserting, by the power management circuit, the low-power control signal thereby enabling the first supply voltage and switching-on the first sub-circuit; and
  in response to switching-on the first sub-circuit, asserting the preload start signal via the power supply monitoring circuit and setting the preload enable signal in order to preload the first configuration data from the first memory slot to the first shadow-register and disable the preloading of the second configuration data from the second memory slot to the second shadow-register and, in response to the preload end signal, transferring the first configuration data from the first shadow-register to the first resource and inhibiting the transfer of the second configuration data from the second shadow-register to the second resource.

18. A One-Time Programmable (OTP) memory controller comprising:
  a data register;
  a given number K of shadow-registers, wherein the number K is smaller than a given number N of memory slots of an OTP memory area;
  a communication interface configured to receive a read request requesting data of a memory slot; and
  a control circuit configured to receive a preload start signal and a shadow-register preload enable signal, wherein the control circuit is configured to manage a preload phase and a data-read phase,
  wherein, in response to the preload start signal, the control circuit is configured to perform the preload phase by:
    determining a mapping between the given number K of shadow-registers and the given number N of memory slots,
    determining, for each of the given number K of shadow-registers, whether a respective shadow-register is preloadable as a function of the shadow-register preload enable signal,
    in response to determining that a shadow-register is preloadable, transferring data from the memory slot to the shadow-register, the memory slot being mapped to the respective shadow-register, and
    once the shadow-register is preloaded based on the shadow-register preload enable signal, asserting a preload end signal and starting the data-read phase.

19. The OTP memory controller according to claim 18, wherein the control circuit is configured to:
  receive a shadow-register mapping signal; and
  determine the mapping between the given number K of shadow-registers and the given number N of memory slots as a function of the shadow-register mapping signal.

20. The OTP memory controller according to claim 18, wherein the control circuit is configured to perform a data-write phase by:
  receiving a write request via the communication interface and selecting a respective memory location indicated in the write request, wherein the write request comprises respective data to be stored in the selected memory location;

determining whether the selected memory location is mapped to a respective shadow-register;

in response to determining that the selected memory location is mapped to the respective shadow-register, selecting the respective shadow-register mapped to the selected memory location, storing the data to be stored to the selected respective shadow-register and programming the data stored to the selected respective shadow-register to the selected memory location; and in response to determining that the selected memory location is not mapped to the respective shadow-register, storing the data to be stored to the data register and programming the data stored to the data register to the selected memory location.

* * * * *